(12) United States Patent
Yang et al.

(10) Patent No.: US 11,159,973 B2
(45) Date of Patent: Oct. 26, 2021

(54) APPARATUSES AND METHODS FOR SCHEDULING CELL MEASUREMENTS ASSOCIATED WITH MULTIPLE SUBSCRIBER IDENTITIES

(71) Applicant: MEDIATEK INC., Hsinchu (TW)

(72) Inventors: Chih-Cheng Yang, Hsinchu (TW); Tsung-Ming Lee, Hsinchu (TW); Wei-Chih Liao, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/704,205

(22) Filed: Dec. 5, 2019

(65) Prior Publication Data
US 2020/0236575 A1 Jul. 23, 2020

Related U.S. Application Data

(60) Provisional application No. 62/794,800, filed on Jan. 21, 2019.

(51) Int. Cl.
| | |
|---|---|
| *H04W 24/10* | (2009.01) |
| *H04W 8/18* | (2009.01) |
| *H04W 48/02* | (2009.01) |
| *H04W 48/20* | (2009.01) |
| *H04W 76/27* | (2018.01) |
| *H04W 88/06* | (2009.01) |
| *H04W 84/04* | (2009.01) |

(52) U.S. Cl.
CPC ............ *H04W 24/10* (2013.01); *H04W 8/18* (2013.01); *H04W 48/02* (2013.01); *H04W 48/20* (2013.01); *H04W 76/27* (2018.02); *H04W 88/06* (2013.01); *H04W 84/045* (2013.01)

(58) Field of Classification Search
CPC ....... H04W 24/10; H04W 8/18; H04W 8/183; H04W 48/02; H04W 48/20; H04W 48/16; H04W 76/27; H04W 88/06; H04W 84/045; H04W 36/0088; H04W 24/08
USPC ....................................... 455/435.1, 558, 557
See application file for complete search history.

(56) References Cited

U.S. PATENT DOCUMENTS

| | | | |
|---|---|---|---|
| 2017/0367085 A1* | 12/2017 | Chakraborty | ......... H04W 8/183 |
| 2020/0267605 A1* | 8/2020 | Bae | ................... H04W 36/0022 |

FOREIGN PATENT DOCUMENTS

WO     2016/122589 A1     8/2016

OTHER PUBLICATIONS

Chinese language office action dated Jan. 8, 2021, issued in application No. TW 109101913.

\* cited by examiner

*Primary Examiner* — Farid Seyedvosoghi
(74) *Attorney, Agent, or Firm* — McClure, Qualey & Rodack, LLP (57) ABSTRACT

A mobile communication device supporting wireless communications using a first subscriber identity and a second subscriber identity is provided. The mobile communication device includes a Radio Frequency (RF) device and a controller. The controller is coupled to the RF device such that the controller performs the following actions: performing a first measurement on a cell via the RF device by using the first subscriber identity to obtain a first measurement result; determining whether the first measurement result is valid; and based on a result of the determining, performing a second measurement on the cell via the RF device by using the second subscriber identity to obtain a second measurement result.

12 Claims, 8 Drawing Sheets

APPARATUSES AND METHODS FOR SCHEDULING CELL MEASUREMENTS ASSOCIATED WITH MULTIPLE SUBSCRIBER IDENTITIES

CROSS REFERENCE TO RELATED APPLICATIONS

This application claims priority of U.S. Provisional Application No. 62/794,800, filed on Jan. 21, 2019, the entirety of which is incorporated by reference herein.

BACKGROUND OF THE APPLICATION

Field of the Application

The application generally relates to wireless communications, and more particularly, to apparatuses and methods for scheduling cell measurements associated with multiple subscriber identities.

Description of the Related Art

With the growing demand for ubiquitous computing and networking, various Radio Access Technologies (RATs) have been developed, such as Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1× EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, New Radio (NR) technology, and others.

Generally, a cellular phone (which may also be referred to as a User Equipment (UE) or Mobile Station (MS)) only supports one RAT and provides the user with flexible mobile communications at all times via the supported RAT using a single subscriber identity card (which provides a single subscriber identity). However, to an increasing extent, more and more people find that having an additional subscriber identity card (which provides an additional subscriber identity) is a good way to reduce their mobile service charges (including voice and/or data services), or to separate personal and business phone calls. In order to alleviate the burden of carrying two cellular phones for two separate subscriber identity cards, so-called dual-card cellular phones have been developed, which generally support one or more RATs for respective mobile services using an individual subscriber identity card. The dual-card design allows calls to be made or received on either subscriber identity amid other mobile services.

However, most dual-card cellular phones are equipped with a single Radio Frequency (RF) device to keep costs low. Due to a single RF device being shared by the transmission/reception operations associated with two separate subscriber identities, only one subscriber identity is allowed to occupy the single RF device for transmission/reception operations at any given time. As a result, the transmission/reception operations associated with one separate subscriber identity will inevitably be affected by the transmission/reception operations associated with another separate subscriber identity.

Figure 1:
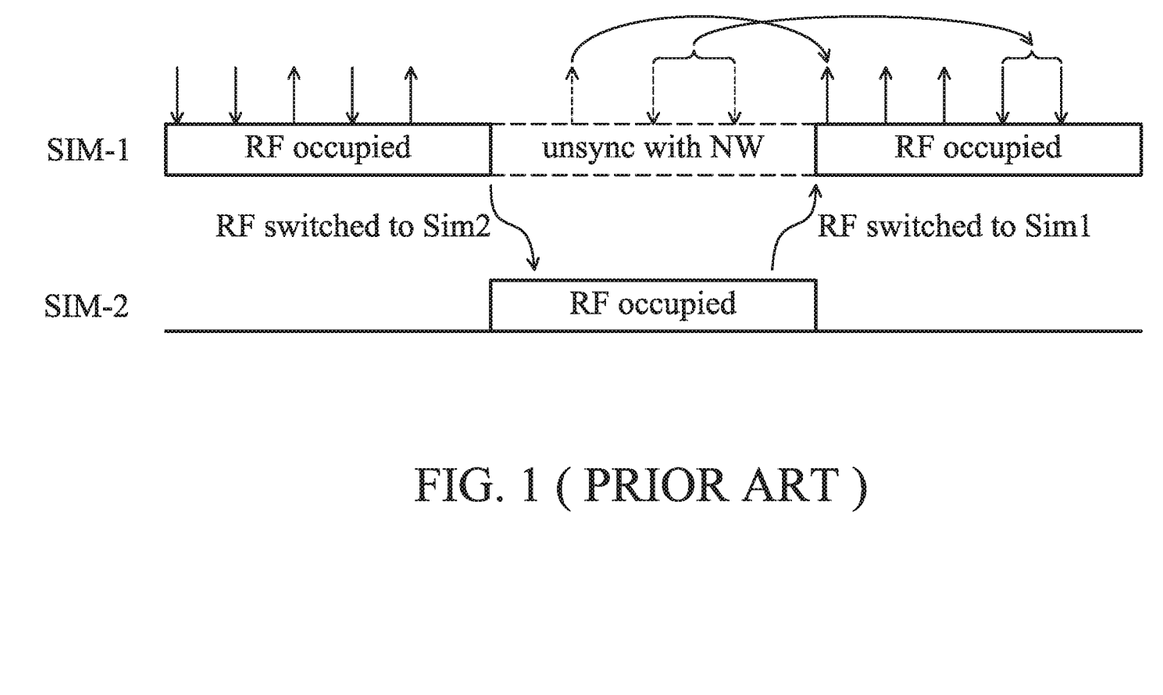
FIG. 1 is a schematic diagram illustrating the performance degradation for Subscriber Identity Module (SIM)-1 caused by cell measurements for SIM-2.

FIG. 1 is a schematic diagram illustrating performance degradation for Subscriber Identity Module (SIM)-1 caused by cell measurements for SIM-2. As shown in FIG. 1, the RF device is allocated to data transmissions and receptions for SIM-1, but during the data transmissions and receptions for SIM-1, the RF device is allocated to cell measurements for SIM-2 for a period of time. In the UL direction, there will be no UL transmission opportunity for SIM-1 during a period of time. In the DL direction, DL assignments for SIM-1 will be missed in this period of time and the UE will have to request the network side to retransmit these missed packets for SIM-1 after this period of time. Consequently, unwanted delay of the data services on SIM-1 will occur, causing bad user experience.

BRIEF SUMMARY OF THE APPLICATION

In order to solve the aforementioned problem, the present application proposes to schedule cell measurements associated with multiple subscriber identities in a way that the valid measurement result obtained using one subscriber identity may be adopted by an upcoming cell measurement for another subscriber identity, as long as the cell to measure is the same. Advantageously, some cell measurements may be skipped, allowing the transmission/reception operations associated with the peer subscriber identity to be interrupted less frequently.

In one aspect of the application, a mobile communication device supporting wireless communications using a first subscriber identity and a second subscriber identity is provided. The mobile communication device comprises a Radio Frequency (RF) device and a controller. The controller is coupled to the RF device such that the controller performs the following: performing a first measurement on a cell via the RF device by using the first subscriber identity to obtain a first measurement result; determining whether the first measurement result is valid; and based on a result of the determining, performing a second measurement on the cell via the RF device by using the second subscriber identity to obtain a second measurement result.

In another aspect of the application, a method for scheduling cell measurements associated with multiple subscriber identities in a mobile communication device comprising an RF device is provided. The method comprises the steps of: performing a first measurement on a cell via the RF device by using a first subscriber identity to obtain a first measurement result; determining whether the first measurement result is valid; and based on a result of the determining, performing a second measurement on the cell via the RF device by using a second subscriber identity to obtain a second measurement result.

Other aspects and features of the present application will become apparent to those with ordinarily skill in the art upon review of the following descriptions of specific embodiments of the mobile communication devices and the methods for scheduling cell measurements associated with multiple subscriber identities.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 2:
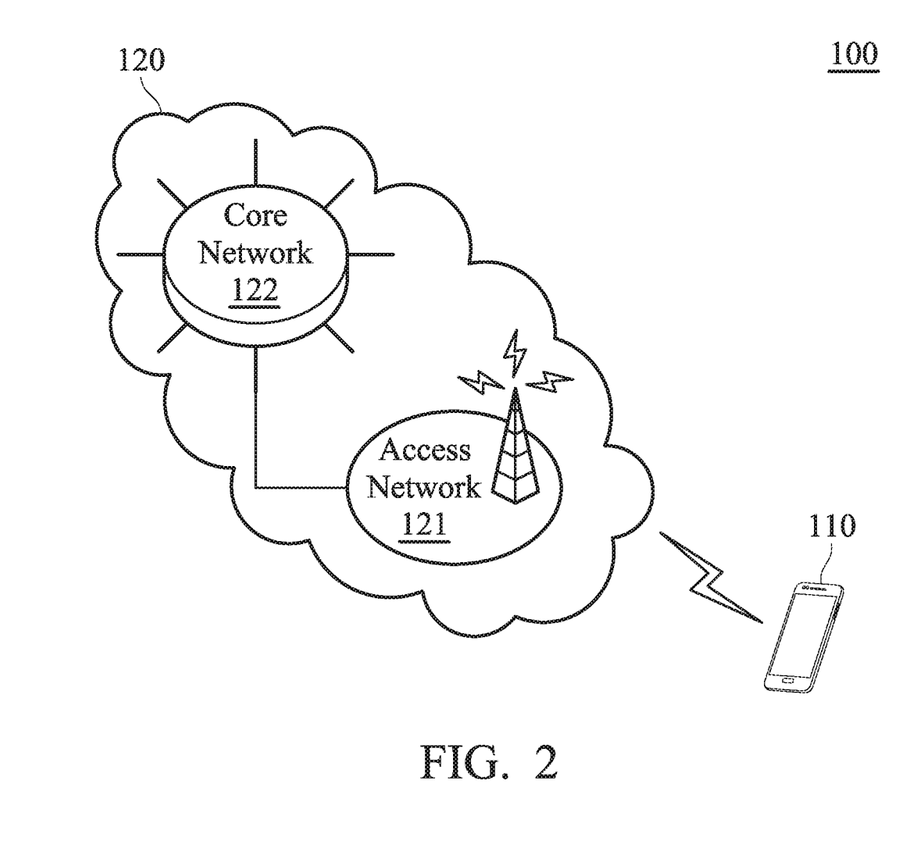
FIG. 2 is a block diagram of a wireless communication environment according to an embodiment of the application.

FIG. 2 is a block diagram of a wireless communication environment according to an embodiment of the application.

As shown in FIG. 2, the wireless communication environment 100 includes a mobile communication device 110 and a service network 120.

The mobile communication device 110 may be referred to as User Equipment (UE) or a Mobile Station (MS), such as a feature phone, a smartphone, a tablet, a laptop computer, or any computing device supporting the RAT utilized by the service network 120.

The mobile communication device 110 may wirelessly communicate with the service network 120 using two separate subscriber identities (also referred to as subscriber numbers).

The subscriber identities may be provided by one or two subscriber identity cards (not shown) in compliance with the specifications of the RAT utilized by the service network 120. For example, the subscriber identity cards may include a Subscriber Identity Module (SIM) card if the service network 120 is a GSM/GPRS/EDGE/IS-95 network, or may include a Universal SIM (USIM) card if the service network 120 is a WCDMA/LTE/LTE-A/TD-LTE/NR network.

Alternatively, the subscriber identities may be directly written into the mobile communication device 110, without the need for any socket to insert any subscriber identity card, or the subscriber identities may be provided by one or more virtual subscriber identity cards (e.g., eSIM/eUSIM), and the present application is not limited thereto.

Specifically, the service network 120 includes an access network 121 and a core network 122. The access network 121 is responsible for processing radio signals, terminating radio protocols, and connecting the mobile communication device 110 with the core network 122. The core network 122 is responsible for performing mobility management, network-side authentication, and interfaces with public/external networks (e.g., the Internet).

The access network 121 and the core network 122 may each include one or more network nodes for carrying out said functions. For example, if the service network 120 is a WCDMA network, the access network 121 may be a Universal Terrestrial Radio Access Network (UTRAN) and the core network 122 may be a GPRS core which includes a Home Location Register (HLR), at least one Serving GPRS Support Node (SGSN), and at least one Gateway GPRS Support Node (GGSN).

If the service network 120 is an LTE/LTE-A/TD-LTE network, the access network 121 may be an Evolved-UTRAN (E-UTRAN) which includes at least an evolved NB (eNB) (e.g., a macro eNB, femto eNB, or pico eNB), and the core network 122 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the service network 120 is an NR network, the access network 121 may be a Next Generation Radio Access Network (NG-RAN) which includes at least a gNB or Transmission Reception Point (TRP), and the core network 122 may be a Next Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session.

The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the description of the wireless communication environment 100 is for illustrative purposes only and is not intended to limit the scope of the application.

Figure 3:
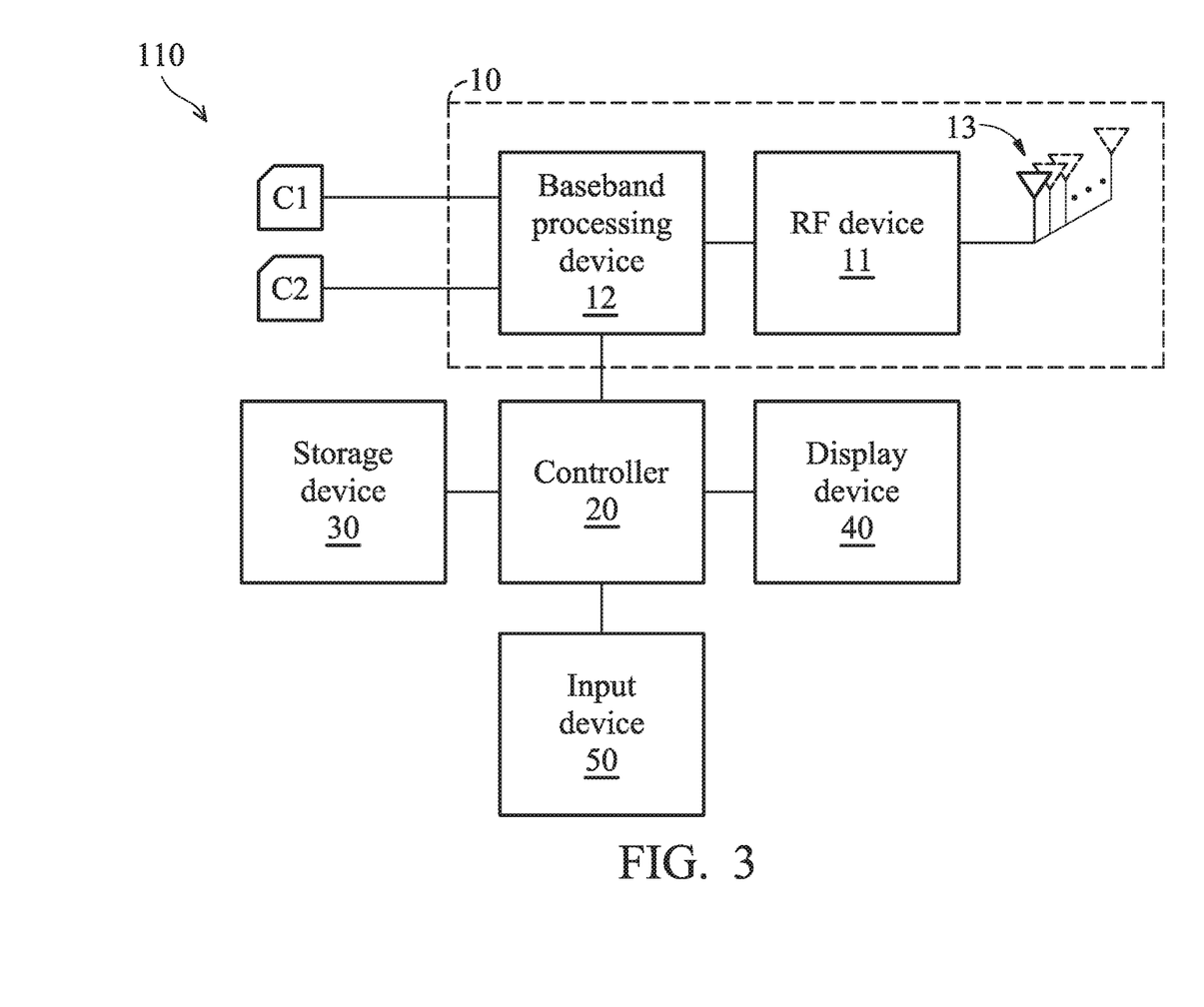
FIG. 3 is a block diagram illustrating the mobile communication device 110 according to an embodiment of the application.

FIG. 3 is a block diagram illustrating the mobile communication device 110 according to an embodiment of the application.

As shown in FIG. 3, the mobile communication device 110 includes a wireless transceiver 10, a controller 20, a storage device 30, a display device 40, and an Input/Output (I/O) device 50.

The wireless transceiver 10 is configured to perform wireless transmission and reception to and from the cells formed by the service network 120 using two subscriber identity cards (denoted as C1 and C2 in FIG. 3), wherein one subscriber identity card may be preconfigured as a data (U)SIM card which is dedicated for data services, while the other subscriber identity card may be preconfigured as a non-data (U)SIM card which is dedicated for non-data services (e.g., call service).

Specifically, the wireless transceiver 10 includes an RF device 11, a baseband processing device 12, and antenna 13, wherein the antenna 13 may include an antenna array for beamforming.

The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may contain multiple hardware devices to perform radio frequency conversion. For example, the RF device 11 may comprise a mixer to multiply the baseband signals with a carrier oscillated in the radio frequency of the supported cellular technologies, wherein the radio frequency may be 900 MHz, 1900 MHz or 2100 MHz utilized in WCDMA systems, or may be 850 MHz, 1900 MHz, or 2100 MHz utilized in IS-95/CDMA-2000/CDMA-2000 1× EV-DO technology, or may be 900 MHz, 2100 MHz, or 2.6 GHz utilized in LTE/LTE-A/TD-LTE technology, or any radio frequency (e.g., 30 GHz-300 GHz for mmWave) utilized in 5G (e.g., NR) systems, or another radio frequency, depending on the RAT in use.

The baseband processing device 12 is configured to perform baseband signal processing and control the communications between the subscriber identity cards C1 and C2 and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

In one embodiment, a dual-card controller (not shown) may be coupled between the baseband processing device 12 and the subscriber identity cards C1 and C2 for powering the subscriber identity cards C1 and C2 with the same or different voltage levels according to the requirements thereof by a Power Management Integrated Chip (PMIC) and a battery, wherein the voltage level for each subscriber identity card is determined during initiation. The baseband processing device 12 may read data from one of the subscriber identity cards C1 and C2, and writes data to one of the subscriber identity cards C1 and C2 via the dual-card controller. In addition, the dual-card controller selectively transfers clocks, resets, and/or data signals to the subscriber identity cards C1 and C2 according to instructions issued by the baseband processing device 12.

In another embodiment, the baseband processing device 12 may include two interfaces (not shown) which independently handle the connections to the subscriber identity cards C1 and C2. It should be understood that the hardware architecture shown in FIG. 3 may be modified to include more than two subscriber identity cards or include only one subscriber identity card, and the application should not be limited thereto.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the function of data processing and computing, controlling the wireless transceiver 10 for coordinating the transmission and reception operations associated with two separate subscriber identities, storing and retrieving data to and from the storage device 30, sending a series of frame data (e.g. representing text messages, graphics, images, etc.) to the display device 40, and receiving/outputting signals from/to the I/O device 50.

In particular, the controller 20 is responsible for coordinating the aforementioned operations of the wireless transceiver 10, the storage device 30, the display device 40, and the I/O device 50 to perform the method of the present application.

In another embodiment, the controller 20 may be incorporated into the baseband processing device 12, serving as a baseband processor.

As will be appreciated by persons skilled in the art, the circuits of the controller 20 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., measurement results), and instructions and/or program code of operating system(s), applications, communication protocols, and/or the method of the present application.

The display device 40 may be a Liquid-Crystal Display (LCD), Light-Emitting Diode (LED) display, Organic LED (OLED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 3 are for illustrative purposes only and are not intended to limit the scope of the application.

For example, the mobile communication device 110 may further include a Wireless-Fidelity (Wi-Fi) device for providing a short-range wireless communication function, a Global Positioning System (GPS) device for use of some location-based services or applications, and/or power, etc. Alternatively, the mobile communication device 110 may include fewer components. For example, the mobile communication device 110 may not include the display device 40 and/or the I/O device 50.

Figure 4:
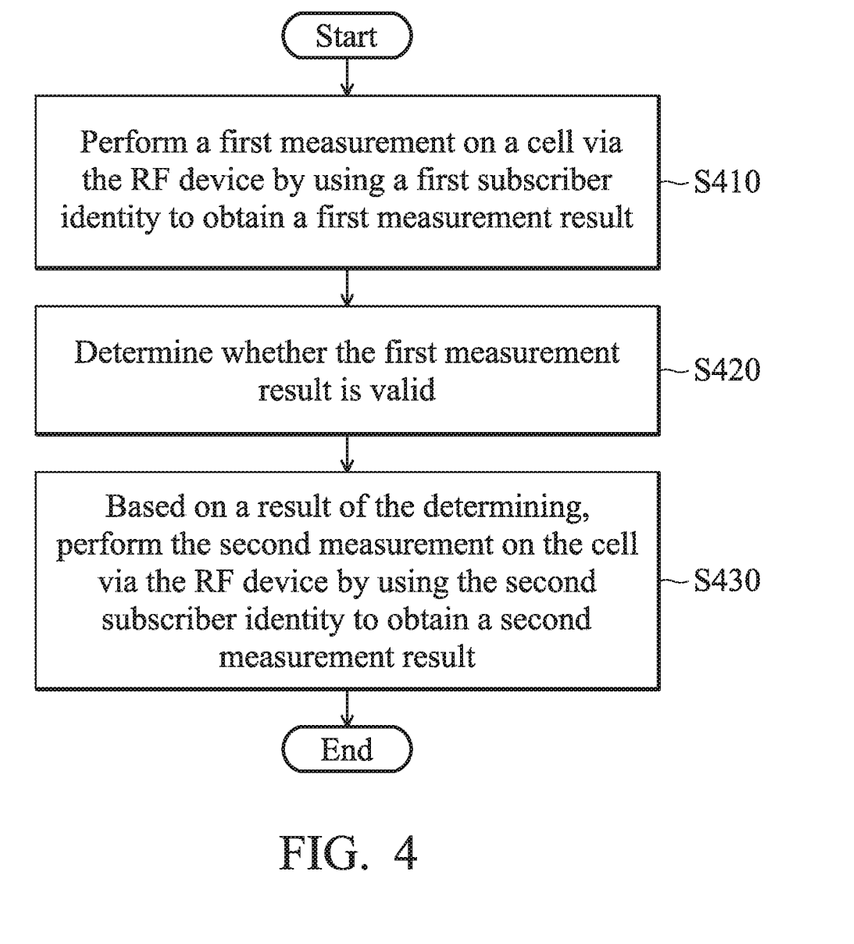
FIG. 4 is a flow chart illustrating the method for scheduling cell measurements associated with multiple subscriber identities in a mobile communication device comprising an RF device according to an embodiment of the application.

FIG. 4 is a flow chart illustrating the method for scheduling cell measurements associated with multiple subscriber identities in a mobile communication device comprising an RF device according to an embodiment of the application.

To being with, the mobile communication device performs a first measurement on a cell via the RF device by using a first subscriber identity to obtain a first measurement result (step S410).

Next, the mobile communication device determines whether the first measurement result is valid (step S420).

In one embodiment, step S420 may be performed when a measurement event for performing a second measurement on the cell via the RF device using a second subscriber identity is detected.

After that, based on a result of the determining in step S420, the mobile communication device performs the second measurement on the cell via the RF device by using the second subscriber identity to obtain a second measurement result (step S430), and the method ends.

Figure 5:
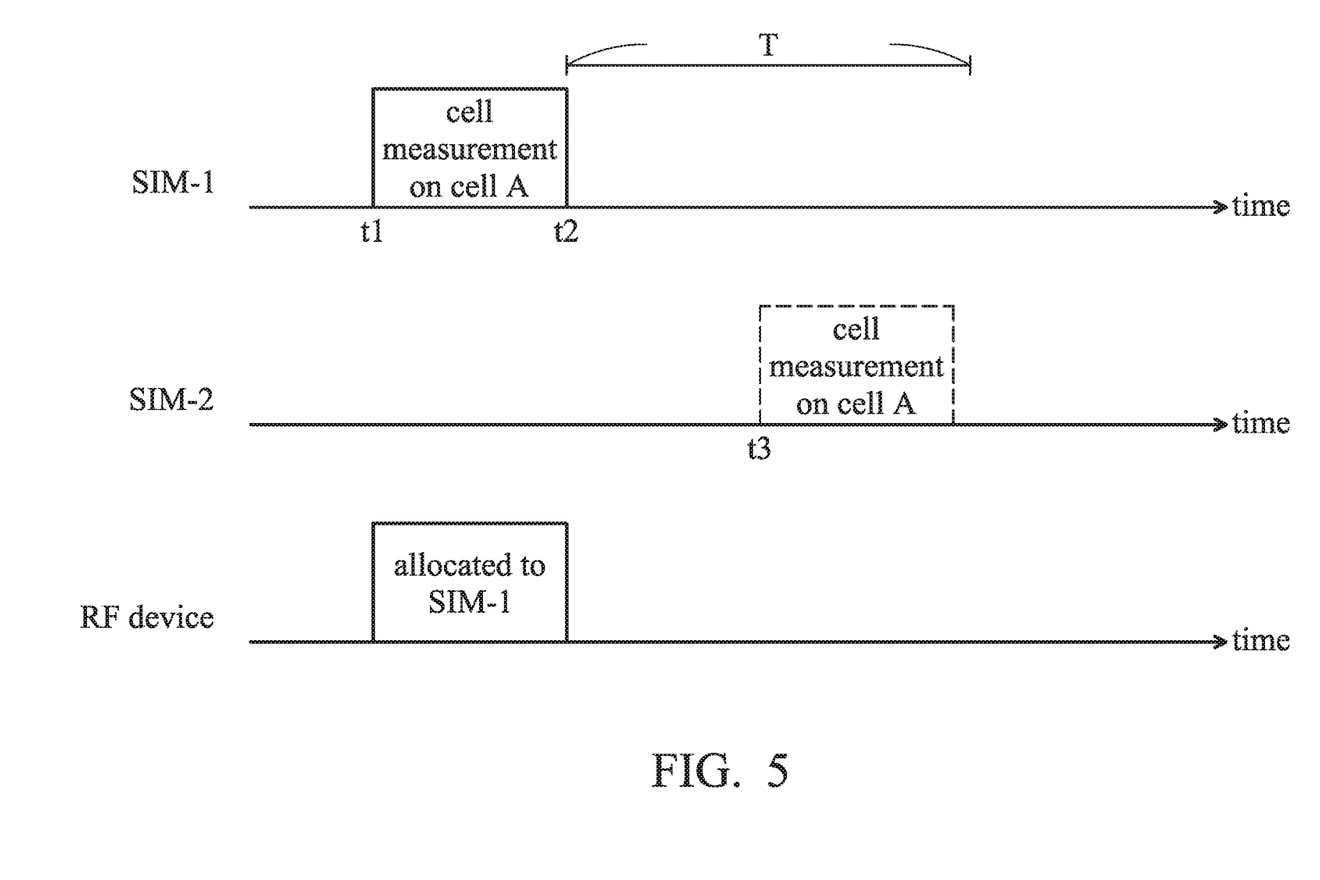
FIG. 5 is a schematic diagram illustrating the scheduling of cell measurements associated with two subscriber identities in the mobile communication device 110 according to an embodiment of the application.

FIG. 5 is a schematic diagram illustrating the scheduling of cell measurements associated with two subscriber identities in the mobile communication device 110 according to an embodiment of the application.

The communication states of the mobile communication device 110 associated with SIM-1 and SIM-2 may both be the Radio Resource Control (RRC) idle mode. Alternatively, the communication states of the mobile communication device 110 associated with SIM-1 and SIM-2 may be the RRC idle mode and the RRC connected mode, respectively, or may be the RRC connected mode and the RRC idle mode, respectively.

Specifically, the RRC idle mode refers to a communication state where no connection is established between the mobile communication device 110 and the service network 120, while the RRC connected mode refers to a communication state where an RRC connection is established between the mobile communication device 110 and the service network 120.

For the convenience of reference, the RRC idle mode and the RRC connected mode are defined in the 3GPP Technical Specification (TS) 25.331 for the WCDMA technology, or in the 3GPP TS 36.331 for the LTE/LTE-A technology, or in the 3GPP TS 38.331 for the NR technology.

During time t1 to t2, the RF device 11 is allocated to perform a measurement on cell A by using SIM-1 to obtain a measurement result R. In one embodiment, the cell A may be a serving cell when both the communication states of the mobile communication device 110 associated with SIM-1 and SIM-2 are the RRC idle mode. In another embodiment, the cell A may be a neighbor cell when the communication states of the mobile communication device 110 associated with SIM-1 and SIM-2 are the RRC idle mode and the RRC connected mode, respectively, or the RRC connected mode and the RRC idle mode, respectively.

To be more specific, the measurement on a cell refers to measuring the signal strength of the cell, wherein the signal strength may include any combination of the following: the Received Signal Strength Indication (RSSI), the Signal-to-Noise Ratio (SNR), the Interference-to-Signal Ratio (ISR), and the Bit Error Rate (BER), etc.

Later, another measurement on cell A using SIM-2 is scheduled at time t3.

However, due to that the measurement result R has not yet expired at time t3, the measurement result R is determined valid and may be used/adopted as the measurement result for the cell measurement scheduled at time t3 for SIM-2. Specifically, within a predetermined period of time (denoted as T in FIG. 5) since time t2, the measurement result R may be determined not expired, i.e., may be determined valid.

Therefore, the cell measurement scheduled at time t3 for SIM-2 may be skipped, i.e., may not be performed at all. That is, the measurement on cell A for SIM-2 is not performed when the measurement result R is valid. In other words, the measurement on cell A for SIM-2 is performed only when the measurement result R is not valid.

In another embodiment, if the measurement result R has not yet expired at time t3, cell measurement on cell A for SIM-2 may not be scheduled at time t3 and the measurement result R may be used/adopted as the measurement result for the cell measurement on cell A for SIM-2. That is, no cell measurement on cell A for SIM-2 is performed at time t3.

Figure 6:
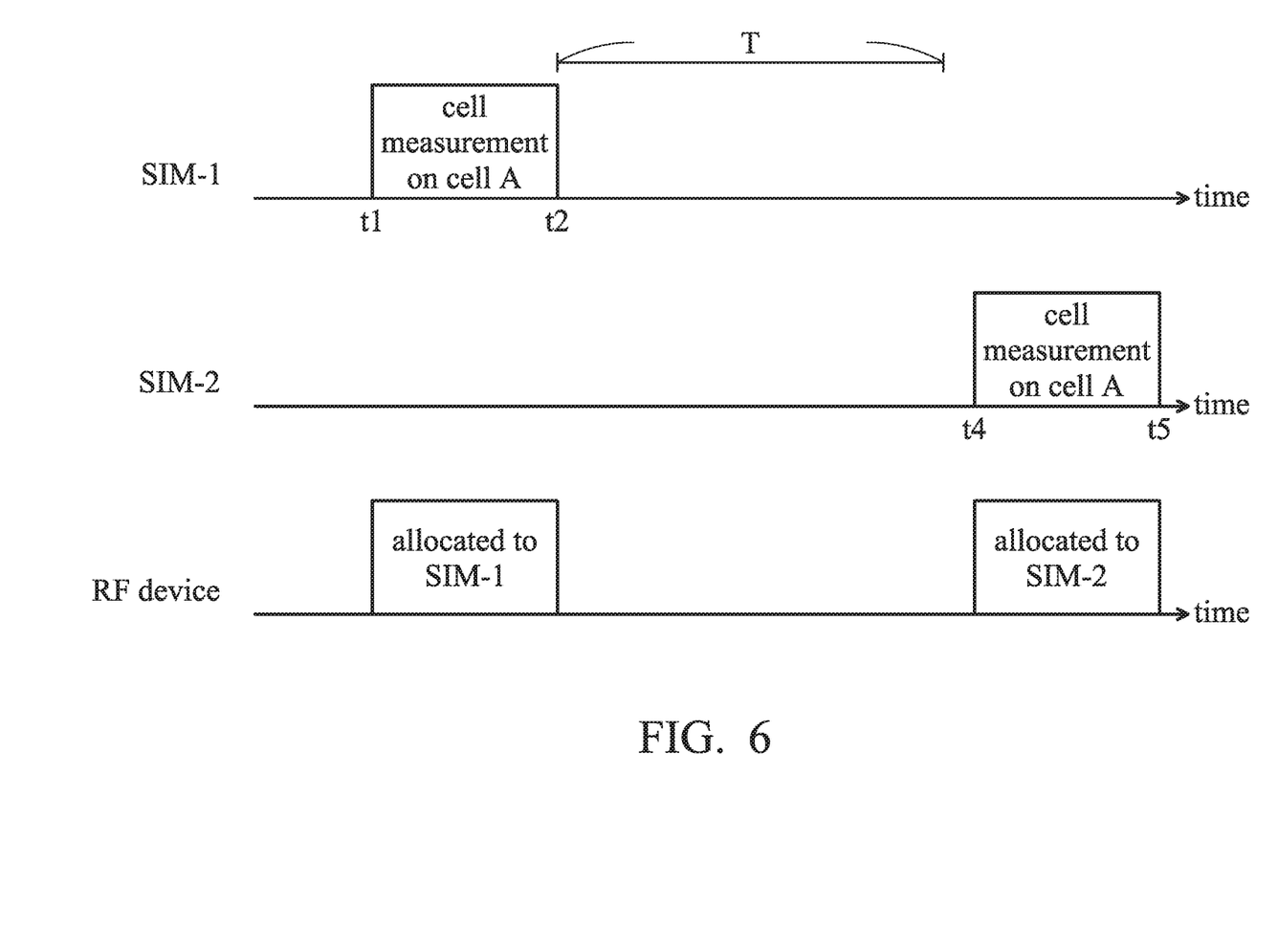
FIG. 6 is a schematic diagram illustrating the scheduling of cell measurements associated with two subscriber identities in the mobile communication device 110 according to another embodiment of the application.

FIG. 6 is a schematic diagram illustrating the scheduling of cell measurements associated with two subscriber identities in the mobile communication device 110 according to another embodiment of the application.

The communication states of the mobile communication device 110 associated with SIM-1 and SIM-2 may be both the RRC idle mode. Alternatively, the communication states of the mobile communication device 110 associated with SIM-1 and SIM-2 may be the RRC idle mode and the RRC connected mode, respectively, or may be the RRC connected mode and the RRC idle mode, respectively.

During time t1 to t2, the RF device 11 is allocated to perform a measurement on cell A by using SIM-1 to obtain a measurement result R. In one embodiment, the cell A may be a serving cell when both the communication states of the mobile communication device 110 associated with SIM-1 and SIM-2 are the RRC idle mode. In another embodiment, the cell A may be a neighbor cell when the communication states of the mobile communication device 110 associated with SIM-1 and SIM-2 are the RRC idle mode and the RRC connected mode, respectively, or the RRC connected mode and the RRC idle mode, respectively.

Later, another measurement on cell A using SIM-2 is scheduled at time t4.

In this embodiment, due to that the measurement result R has expired at time t4, the measurement result R is determined not valid and may not be used/adopted as the measurement result for the cell measurement scheduled at time t4 for SIM-2.

Therefore, during time t4 to t5, the RF device 11 is allocated to perform another measurement on cell A by using SIM-2 to obtain a measurement result R'.

That is, the measurement on cell A for SIM-2 is performed when the measurement result R is not valid.

In view of the foregoing embodiments of FIGS. 5-6, it should be appreciated that the present application realizes an improved scheduling of cell measurements associated with multiple subscriber identities, by allowing valid measurement results to be shared between the multiple subscriber identities. Advantageously, some cell measurements may be skipped to reduce power consumption of the UE.

Figure 7:
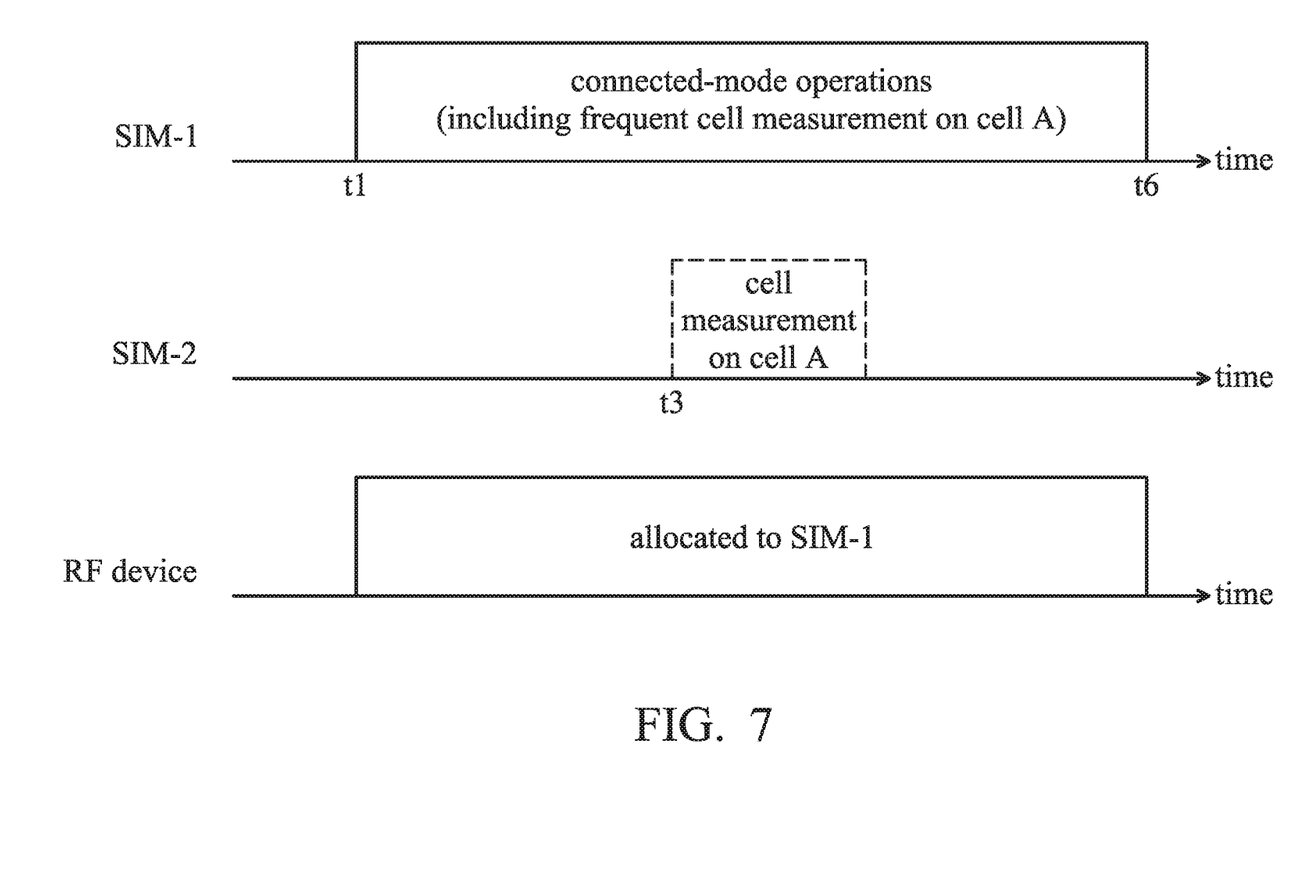
FIG. 7 is a schematic diagram illustrating the scheduling of cell measurements associated with two subscriber identities in the mobile communication device 110 according to another embodiment of the application.

FIG. 7 is a schematic diagram illustrating the scheduling of cell measurements associated with two subscriber identities in the mobile communication device 110 according to another embodiment of the application.

In this embodiment, the communication state of the mobile communication device 110 associated with SIM-1 is the RRC connected mode, while the communication state of the mobile communication device 110 associated with SIM-2 is the RRC idle mode.

During time t1 to t6, the RF device 11 is allocated to perform connected-mode operations associated with SIM-1, wherein the connected-mode operations include using SIM-1 to frequently perform a measurement on cell A to update the measurement result R. In one embodiment, the cell A may be a serving cell. In another embodiment, the cell A may be a neighbor cell specified by network.

Due to that the measurement result R has been kept fresh (i.e., not expired) during time t1 to t6, the measurement result R is determined valid at time t3 and may be used/adopted as the measurement result for the cell measurement for SIM-2.

Therefore, the cell measurement for SIM-2 may not be scheduled and performed at time t3. That is, the measurement on cell A for SIM-2 is not performed when the measurement result R is valid. In other words, the measurement on cell A for SIM-2 is performed only when the measurement result R is not valid.

In another embodiment, the cell measurement on cell A for SIM-2 may be scheduled at time t3 at first, and then skipped due to that the measurement result R is determined valid.

In view of the foregoing embodiment of FIG. 7, it should be appreciated that the present application realizes an improved scheduling of cell measurements associated with multiple subscriber identities, by allowing valid measurement results to be shared between the multiple subscriber identities. Advantageously, the single RF device may not be allocated to the peer subscriber identity and the opportunity of data service interruption caused by cell measurements for the peer subscriber identity is reduced.

Figure 8:
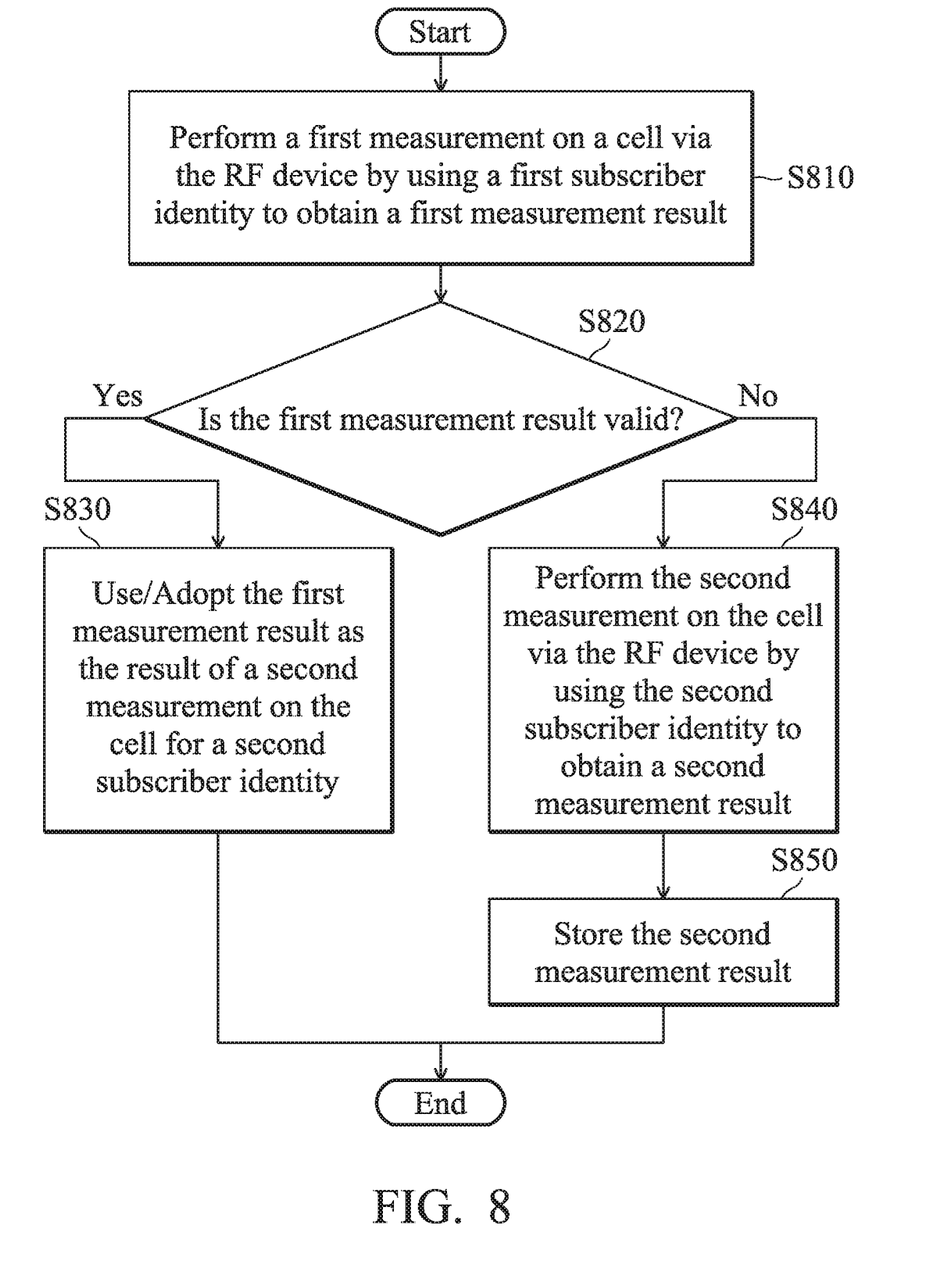
FIG. 8 is a flow chart illustrating the method for scheduling cell measurements associated with multiple subscriber identities in a mobile communication device comprising an RF device according to another embodiment of the application.

FIG. 8 is a flow chart illustrating the method for scheduling cell measurements associated with multiple subscriber identities in a mobile communication device comprising a RF device according to another embodiment of the application.

To begin with, the mobile communication device performs a first measurement on a cell via the RF device by using a first subscriber identity to obtain a first measurement result (step S810).

Next, the mobile communication device determines whether the first measurement result is valid (step S820).

In one embodiment, step S820 may be performed when a measurement event for performing a second measurement on the cell via the RF device using a second subscriber identity is detected.

Subsequent to step S820, if the first measurement result is valid, the mobile communication device uses or adopts the first measurement result as the result of the second measurement (step S830).

Subsequent to step S820, if the first measurement result is not valid, the mobile communication device performs the second measurement on the cell via the RF device by using the second subscriber identity to obtain a second measurement result (step S840), and then stores the second measurement result (step S850).

For example, a measurement result may be stored with a timestamp recording the time of the measurement result being stored. Latter, in determining whether the measurement result is valid, the elapsed time since the timestamp is compared to a predetermined period of time. If the elapsed time is less than the predetermined period of time, the measurement result is determined valid. Otherwise, if the elapsed time is greater than or equal to the predetermined period of time, the measurement result is determined not valid.

Subsequent to steps S830 and S850, the method ends.

In view of the foregoing embodiments, it should be appreciated that the present application realizes an improved scheduling of cell measurements associated with multiple subscriber identities, by allowing valid measurement results to be shared between the multiple subscriber identities. Advantageously, some cell measurements may be skipped to reduce power consumption of the UE and to reduce the opportunity of data service interruption caused by cell measurements for the peer subscriber identity.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, supporting wireless communications using a first subscriber identity and a second subscriber identity, comprising:
   a Radio Frequency (RF) device; and
   a controller, coupled to the RF device such that the controller performs:
   performing a first measurement on a cell via the RF device by using the first subscriber identity to obtain a first measurement result;
   determining whether the first measurement result obtained using the first subscriber identity is valid; and
   based on a result of the determining, performing a second measurement on the cell via the RF device by using the second subscriber identity different from the first subscriber identity to obtain a second measurement result.

2. The mobile communication device of claim 1, wherein in the determining whether the first measurement result is valid, the controller performs:
   determining whether the first measurement result has expired according to a predetermined period of time.

3. The mobile communication device of claim 1, wherein in performing the second measurement on the cell based on the result of the determining, the controller performs:
   performing the second measurement on the cell via the RF device by using the second subscriber only when the measurement result of the first cell is determined not valid.

4. The mobile communication device of claim 1, wherein in performing the second measurement on the cell based on the result of the determining, the controller performs:
   performing the second measurement on the cell via the RF device by using the second subscriber when the measurement result of the first cell is determined not valid.

5. The mobile communication device of claim 1, wherein the first measurement on the cell is performed when a communication state of the mobile communication device associated with the first subscriber identity is a Radio Resource Control (RRC) connected mode.

6. The mobile communication device of claim 1, wherein the determining of whether the first measurement result is valid is performed when a communication state of the mobile communication device associated with the second subscriber identity is a Radio Resource Control (RRC) idle mode.

7. A method for scheduling cell measurements associated with multiple subscriber identities in a mobile communication device comprising a Radio Frequency (RF) device, the method comprising:
performing a first measurement on a cell via the RF device by using a first subscriber identity to obtain a first measurement result;
determining whether the first measurement result obtained using the first subscriber identity is valid; and
based on a result of the determining, performing a second measurement on the cell via the RF device by using a second subscriber identity different from the first subscriber identity to obtain a second measurement result.

8. The method of claim 7, wherein the step of determining whether the first measurement result is valid comprises:
determining whether the first measurement result is expired according to a predetermined period of time.

9. The method as claimed in claim 7, wherein the step of performing the second measurement on the cell based on the result of the determining comprises:
performing the second measurement on the cell via the RF device by using the second subscriber only when the measurement result of the first cell is determined not valid.

10. The method as claimed in claim 7, wherein the step of performing the second measurement on the cell based on the result of the determining comprises:
performing the second measurement on the cell via the RF device by using the second subscriber when the measurement result of the first cell is determined not valid.

11. The method of claim 7, wherein the first measurement on the cell is performed when a communication state of the mobile communication device associated with the first subscriber identity is a Radio Resource Control (RRC) connected mode.

12. The method of claim 7, wherein the determining of whether the first measurement result is valid is performed when a communication state of the mobile communication device associated with the second subscriber identity is a Radio Resource Control (RRC) idle mode.

* * * * *